(12) United States Patent
Ino (10) Patent No.: US 7,746,268 B2
(45) Date of Patent: Jun. 29, 2010

(54) MODE S SECONDARY SURVEILLANCE RADAR

(75) Inventor: Masami Ino, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 178 days.

(21) Appl. No.: 12/180,713

(22) Filed: Jul. 28, 2008

(65) Prior Publication Data

US 2009/0085792 A1 Apr. 2, 2009

(30) Foreign Application Priority Data

Sep. 27, 2007 (JP) .......................... P2007-252325

(51) Int. Cl.
G01S 13/00 (2006.01)

(52) U.S. Cl. .............................. 342/37; 342/36; 342/38

(58) Field of Classification Search .............. 342/36–40
See application file for complete search history.

(56) References Cited

U.S. PATENT DOCUMENTS

| 4,454,510 | A  | * | 6/1984  | Crow         | 342/32     |
| 6,337,652 | B1 | * | 1/2002  | Shiomi et al. | 342/37    |
| 6,344,820 | B1 | * | 2/2002  | Shiomi et al. | 342/174   |
| 6,778,133 | B1 | * | 8/2004  | Cole et al.  | 342/357.03 |
| 7,408,498 | B2 | * | 8/2008  | Kuji et al.  | 342/37    |
| 7,501,977 | B2 | * | 3/2009  | Ino          | 342/37     |
| 7,612,705 | B2 | * | 11/2009 | Ino          | 342/37     |
| 7,663,531 | B2 | * | 2/2010  | Kuji et al.  | 342/32    |
| 2004/0263380 | A1 | * | 12/2004 | Cole et al. | 342/36    |
| 2005/0083226 | A1 | * | 4/2005  | Kuji et al. | 342/29    |
| 2006/0181447 | A1 | * | 8/2006  | Kuji et al. | 342/32    |
| 2007/0252750 | A1 | * | 11/2007 | Jean et al. | 342/40    |
| 2008/0106455 | A1 | * | 5/2008  | Ino         | 342/32    |
| 2009/0085792 | A1 | * | 4/2009  | Ino         | 342/37    |

FOREIGN PATENT DOCUMENTS

EP 1873554 A 1/2008

OTHER PUBLICATIONS

U.S. Appl. No. 11/627,552, filed Jan. 26, 2007, Masami Ino.
Yoshio Hasahida, et al., "Secondary Surveillance Radar for Air Traffic Control—SSR Mode S", Toshiba Review, vol. 59, No. 2, 2004, pp. 58-61 (with Partial English Translation).
Stevens M.C.: "Secondary Surveillance Radar, Chapter 12—Mode S"; Secondary Surveillance Radar, Norwood, Artech House, US, XP002454134, Jan. 1, 1988, pp. 251-276.

* cited by examiner

*Primary Examiner*—Thomas H Tarcza
*Assistant Examiner*—Peter M Bythrow
(74) *Attorney, Agent, or Firm*—Oblon, Spivak, McClelland, Maier & Neustadt, L.L.P.

(57) ABSTRACT

A transmitter (13) operates in an immediate scan after an initial acquisition or detection of an altered aircraft ID by a changed flight status, to transmit to an aircraft a sequence of interrogation signals requesting an aircraft ID transmission, a verifier (17) operates upon acquisition of a reply signal including an aircraft ID transmitted from a transponder on the aircraft, to store in a memory (17a) a mode S address assigned to the aircraft and the aircraft ID in an associating manner, and upon an occurrence of a storage of aircraft IDs associated with the mode S address in the memory (17a), to determine whether or not the aircraft ID is correct, depending on whether or not the aircraft IDs have a match therein, and a report generator (18) operates upon a determination for the aircraft ID to be correct, to prepare a target report using the aircraft ID.

5 Claims, 8 Drawing Sheets

MODE S SECONDARY SURVEILLANCE RADAR

CROSS REFERENCE TO RELATED APPLICATIONS

The present application claims the benefit of priority under 35 U.S.C. §119 to Japanese Patent Application No. 2007-252325, filed on Sep. 27, 2007, the entire contents of which are incorporated herein by reference.

BACKGROUND OF THE INVENTION

1. Field of Art

The present invention relates to a mode S secondary surveillance radar for detecting aircraft fitted with mode S transponders.

2. Description of Relevant Art

For air traffic control, ground stations have a mode S secondary surveillance radar (SSR mode S) adapted for detecting aircraft to prepare target reports to be used. The mode S secondary surveillance radar is adapted to acquire, from aircraft fitted with mode S transponders (mode S aircraft) in the radar coverage, their position data (slant ranges, azimuths), altitude data, aircraft IDs (identities), etc, prepare target reports thereon, and provide them to a control system to implement air traffic control. Such protocols are internationally unified (see e.g. ICAO Doc. 9684 "Manual of the Secondary Surveillance Radar (SSR) Systems", "6.3 Surveillance Protocol").

Figure 1:
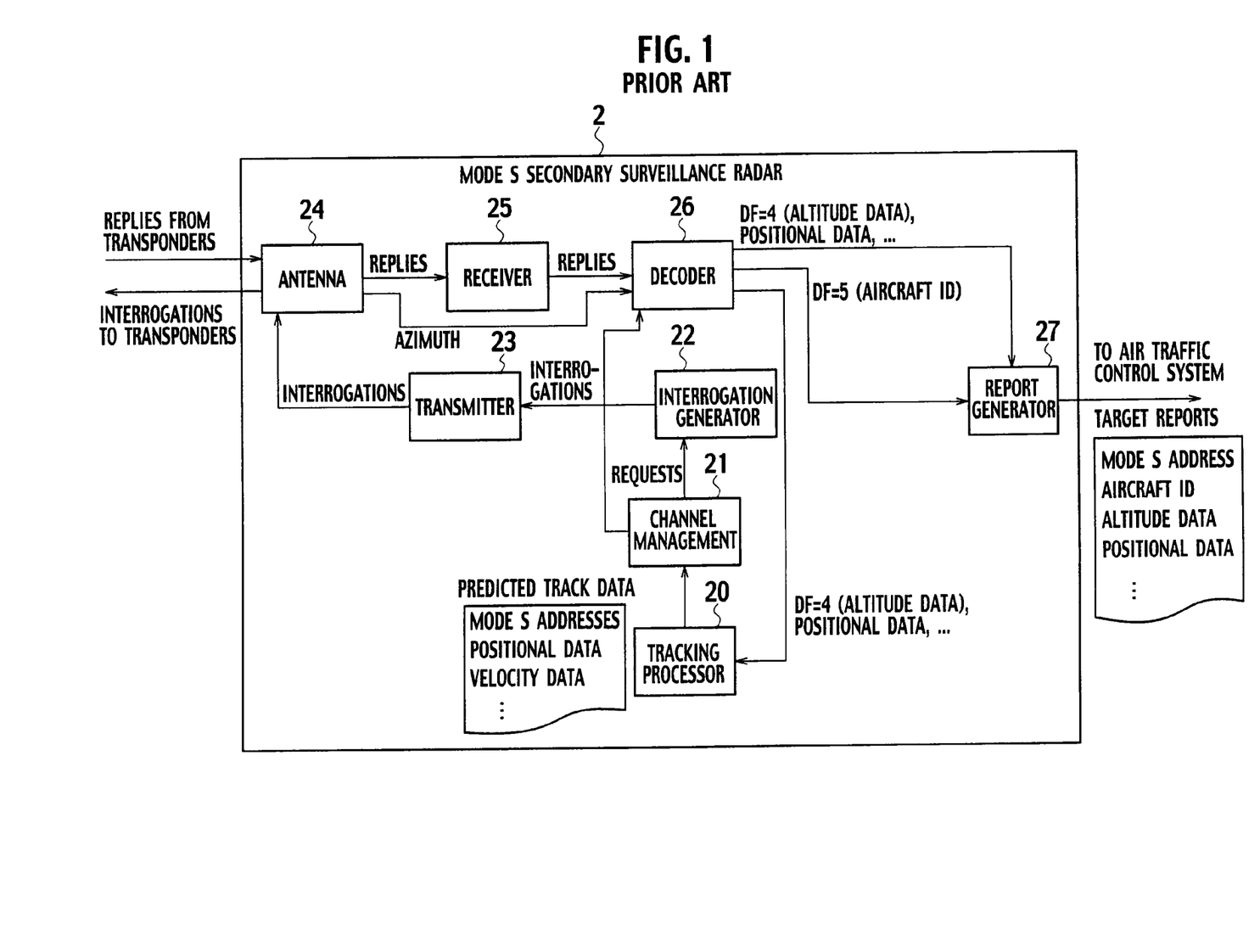
FIG. 1 is a functional block diagram of a mode S secondary surveillance radar in the past.

For example, as shown in FIG. 1, a mode S secondary surveillance radar 2 in the past includes an interrogation generator 22 that responds to requests from a channel management 21 by generating interrogations, of which signals are transmitted from a transmitter 23, through an antenna 24, to transponders on mode S aircraft. To interrogations thus sent out, replies from transponders are sent back, of which signals are received through the antenna 24 by a receiver 25, and input to a decoder 26 with listening windows opened in accordance with periods requested from channel management 11. The decoder 26 decodes input reply signals to acquire information including altitudes and IDs of targets, which is output to a report generator 27. Given information including aircraft IDs and altitudes, the report generator 27 prepares target reports containing information with aircraft IDs and altitudes inclusive, which are provided to air traffic control system.

The mode S secondary surveillance radar 2 acquires information of a respective aircraft by a protocol including: (1) an initial acquisition by a combination of all-call interrogations and replies thereto including replies from the aircraft; and (2) a tracking acquisition by a sequence of transactions each consisting of a selective interrogation and a reply to and from the aircraft as a target (see e.g. "Secondary Surveillance Rader SSR Mode S for Air Traffic Control" by Yoshio HASHIDA, Hisashi OHTOMO, & Yoshinori KUJI, Toshiba Review Vol. 59, No. 2, 2004, pp. 58-61).

Figure 2:
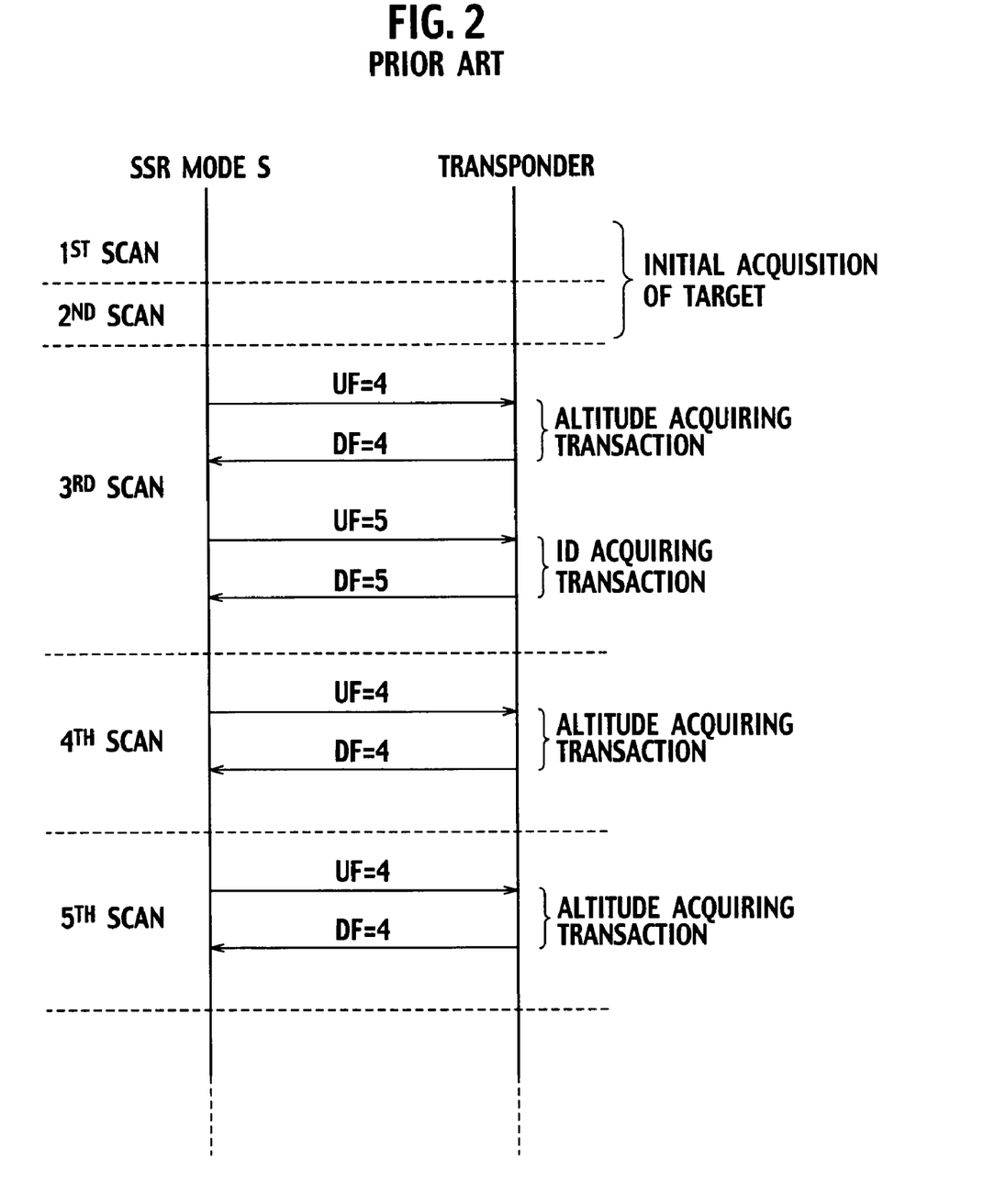
FIG. 2 is a time chart of an exemplary sequence of transactions along scans of the mode S secondary surveillance radar in the past.

As shown in FIG. 2, the mode S secondary surveillance radar 2 on the ground first performs an initial acquisition by all-call interrogations followed by replies from transponders on mode S aircraft (in a $1^{st}$ scan and a $2^{nd}$ scan), where it obtains data on aircraft to be targets, including their mode S addresses, positions, and the like. After this, the mode S secondary surveillance radar 2 starts tracking each aircraft as a target, entering an individual acquisition by sequential selective transactions (UF [uplink format]=4/DF [downlink format]=4 and UF=5/DF=5, in a $3^{rd}$ scan), where it acquires data on altitude and aircraft ID of the target. Thereafter, the mode S secondary surveillance radar 2 keeps up a continual acquisition by selective transactions (UF=4/DF=4) to acquire data on altitude of the target, so long as the tracking is continued at a tracking processor 20 in FIG. 1 (in a $4^{th}$ scan, a $5^{th}$ scan, and unshown subsequent scans).

Each altitude acquiring transaction (UF=4/DF=4) provides a data on altitude, which is variable with time, as the aircraft flies in the air. Therefore, the mode S secondary surveillance radar 2 is adapted to acquire an altitude data every scan (each of the $3^{rd}$ to $5^{th}$ scans and subsequent scans) after the above-noted initial acquisition, and prepare a target report using an altitude data acquired in each scan.

The aircraft ID is a unique value (referred to as a "beacon code" or "mode A code", as well) set to a flight plan defining, among others, a route and clock times of an associated flight, and once set up, it will not be altered during the flight as a rule. Therefore, the mode S secondary surveillance radar 2 executes an ID acquiring transaction (UF=5/DF=5) for acquiring an aircraft ID of the target in the $3^{rd}$ scan just after the initial acquisition, and prepares target reports repeatedly using the aircraft ID acquired in the $3^{rd}$ scan, without additional acquisition of aircraft ID in subsequent scans being the $4^{th}$, the $5^{th}$, et seq.

The aircraft ID may well be altered during a flight by a rare occurrence of an air traffic controller's instruction or in an emergency, where the DF=4 reply to be acquired every scan has its flight status (FS) changed. Therefore, detection of a changed flight status is coped with in an immediate sweep by execution of an additional ID acquiring transaction (UF=5/DF=5) for acquiring a new aircraft ID, before subsequent scans in which simply altitude acquiring transactions (UF=4/DF=4) are to be executed.

For each scan, which is limited in time, the mode S secondary surveillance radar 2 repeatedly employs an aircraft ID once acquired, allowing for an efficient use of the limited scan time. That is, the mode S secondary surveillance radar 2 is afforded to devote a remaining scan time to other aircraft, for transactions and data communications therewith.

Such a repetition in use of an aircraft ID once acquired is supported by a CRC function in the mode S reply that implements a reliable data acquisition. That is, the mode S secondary surveillance radar 2 relies on the aircraft ID once acquired, to repeat the use.

However, the CRC function in mode S reply has a nominal error rate of $10^{-7}$, with an anxiety of a failure to detect an occurrence of error with a probability of $10^{-7}$. Should an error occur in a transaction (UF=5/DF=5) in an immediate scan after the initial acquisition, target reports containing an erroneous aircraft ID might be prepared in subsequent scans, for use in air traffic control, which is problematic to the safety of air traffic control.

The present invention has been devised with this point in view. It therefore is an object of the present invention to provide a mode S secondary surveillance radar adapted for acquisition of a correct aircraft ID to output a reliable target report with contribution to an ensured safety of air traffic control.

SUMMARY OF THE INVENTION

According to an aspect of the present invention, a mode S secondary surveillance radar for detecting aircraft flying in an airspace under surveillance comprises a transmitter adapted in an immediate scan after one of an initial acquisition and a detection of an altered aircraft ID by a changed flight status, to transmit to an aircraft a sequence of interrogation signals requesting an aircraft ID transmission, a determiner adapted upon an acquisition of a reply signal including an aircraft ID transmitted from a transponder on the aircraft, to store in a memory a mode S address assigned to the aircraft and the aircraft ID in an associating manner, and upon an occurrence of a storage of aircraft IDs associated with the mode S address in the memory, to determine whether or not the aircraft ID is correct, depending on whether or not the aircraft IDs have a match therein, and a reporter adapted upon a determination for the aircraft ID to be correct, to prepare a target report using the aircraft ID.

DETAILED DESCRIPTION OF THE EMBODIMENTS

There will de described best modes of embodiment for carrying out the invention with reference to the accompanying drawings.

Figure 3:
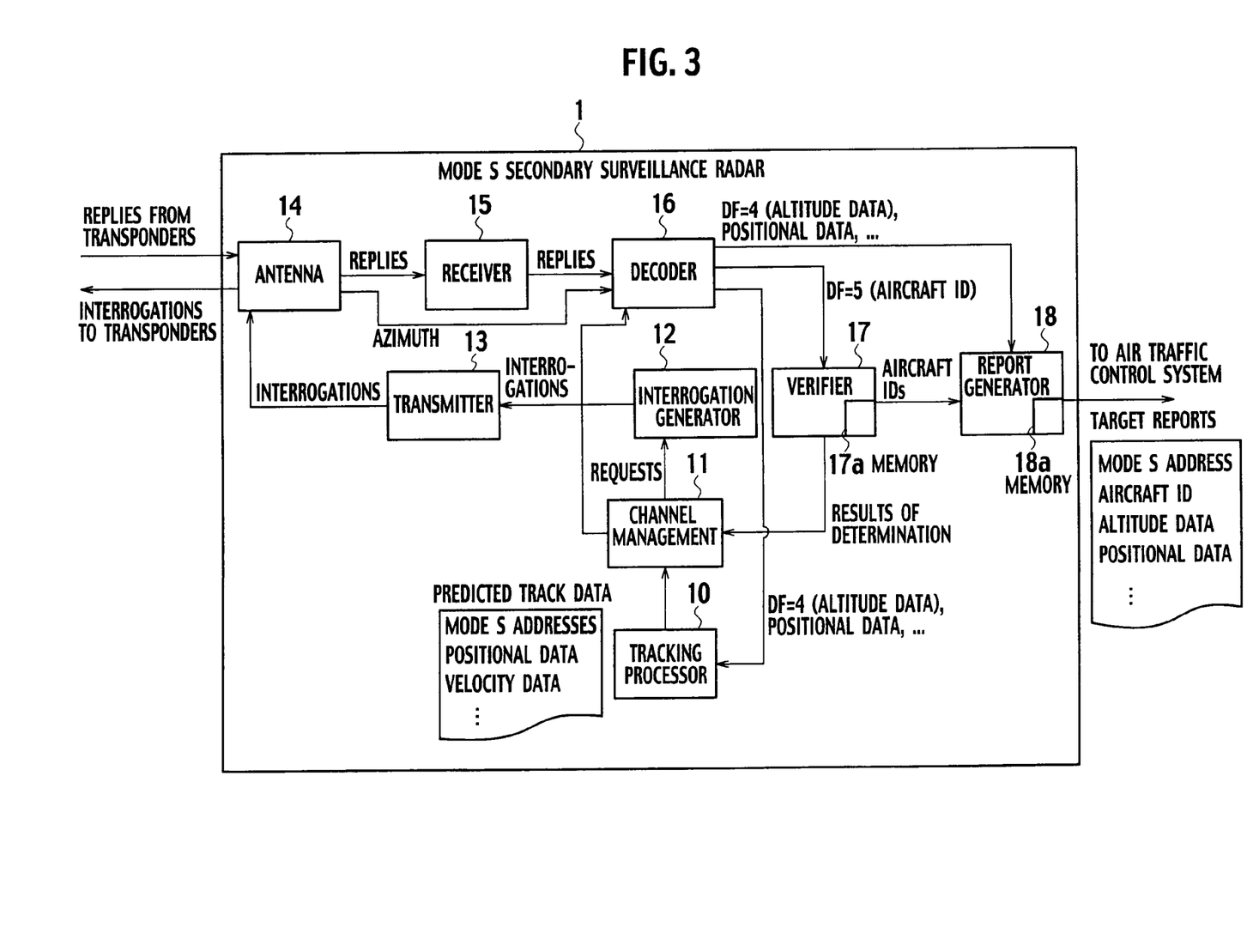
FIG. 3 is a functional block diagram of a mode S secondary surveillance radar according to an embodiment of the present invention.

FIG. 3 shows in a functional block diagram a mode S secondary surveillance radar 1 according to an embodiment of the present invention, which is configured for detecting aircraft (as mode S aircraft) fitted with mode S transponders, to output results of the detection as target reports to a control system for air traffic control.

As shown in FIG. 3, the mode S secondary surveillance radar 1 includes: a channel management 11 for generating request signals requesting transmission of interrogation signals in accordance with e.g. predicted track data input from a tracking processor 10; an interrogation generator 12 for generating interrogation signals in accordance with request signals input from the channel management 11; and a transmitter 13 for transmitting interrogation signals input from the interrogation generator 12, through an antenna 14 to transponders on mode S aircraft. The mode S secondary surveillance radar 1 has: a receiver 15 for receiving reply signals transmitted from transponders through the antenna 14; a decoder 16 for opening listening windows in accordance with periods requested from channel management 11 and decoding reply signals input from the receiver 15; a verifier 17 for determining target-wise, on a basis of aircraft IDs acquired in a scan and input from the decoder 16, whether or not an acquired aircraft ID is correct; and a reporter 18 for preparing target-wise a target report based on an altitude data input from the decoder 16 and a correct aircraft ID input from the verifier 17.

The tracking processor 10 is adapted for estimation of, among others, a track and a flying velocity of a respective target in each scan based on a combination of scan-wise data (on an altitude, a position in terms of a range in an azimuth, etc) of the target input from the decoder 16, an azimuth signal as information on a rotation of the antenna 14, and the like. The tracking processor 10 predicts a track defined by a flying position and a velocity of a respective target in the next scan, and outputs to the channel management 11 a set of "predicted track data" including a combination of predicted data (positional data, velocity data, etc) on the target and a mode S address (sometimes called "aircraft address") uniquely assigned to the target for identification of the aircraft (body).

The channel management 11 is adapted to accommodate schedules to generate request signals, and output these to the interrogation generator 12. More specifically, the channel management 11 is adapted in all-call periods to generate request signals for all-call interrogations to be completed with occasional replies. Further, it is adapted in roll-call periods to generate request signals based on sets of predicted track data input from the tracking processor 10, for roll-call interrogations to be completed with necessary replies. For example, in a roll-call period, the channel management 11 responds to a set of predicted track data input from the tracking processor 10, by making within a beam dwell time a schedule of transmission timings for signals of selective interrogations to be transmitted to a target in a subsequent scan, and generates, and outputs to the interrogation generator 12, a sequence of request signals defining transmission timings, transmission positions, etc. Further, the channel management 11 outputs request signals to the decoder 16 to open listening windows, so that reply signals are properly input to the decoder 16.

The interrogation generator 12 is adapted to generate interrogation signals in accordance with request signals input from the channel management 11. The interrogation generator 12 is adapted to output to the transmitter 13 the generated interrogation signals by timings defined by the request signals. For example, given a request signal requesting a transmission of all-call interrogation, the interrogation generator 12 produces an all-call interrogation as a signal for interrogation. Given a request signal requesting a transmission of selective interrogation, the interrogation generator 12 produces, as a signal for interrogation, a selective interrogation to a transponder of a target that has been identified by a mode S address contained in a set of predicted truck data.

The transmitter 13 is adapted to transmit a signal for interrogation (all-call or selective) input from the interrogation generator 12, through the antenna 14 to a transponder or transponders of mode S aircraft. The receiver 15 is adapted to receive through the antenna 14 (a) reply signal(s) transmitted from the transponder or transponders in response to the interrogation signal, and output the reply signal(s) to the decoder 16. The antenna 14 is configured to sequentially output to the decoder 16 an azimuth signal representing a rotation of the antenna 14.

The decoder 16 is adapted to decode reply signals input from the receiver 15 with listening windows opened in accordance with period requests from channel management 11, and output then acquired data to the tracking processor 10, the verifier 17, and the report generator 18, as necessary. The decoder 16 decodes a DF=4 reply signal to acquire a set of data on an altitude and a location, a mode S address, and the like, and outputs it together with an associated antenna azimuth data to the tracking processor 10 and the report generator 18. The decoder 16 decodes a DF=5 reply signal to acquire a set of data with an aircraft ID inclusive, and outputs it to the verifier 17. Those reply signals (DF=4 and DF=5) have information on a mode S address for identification of aircraft, which is output from the decoder 16 as part of the set of data including data on an altitude or an aircraft ID.

The verifier 17 has a memory 17a for storage to store therein a target-wise data set from the decoder 16 defining an aircraft ID and an associated mode S address. The verifier 17 is adapted to target-wise determine, on a basis of aircraft IDs stored in the memory 17a, whether or not an aircraft ID stored in the memory 17a is correct, and output to the report generator 18 an aircraft ID determined to be correct together with an associated mode S address. The verifier 17 is adapted to output a result of determination to the channel management 11.

More specifically, when a new data set defining an aircraft ID and an associated mode S address is input from the decoder 16, if an aircraft ID having been stored in the memory 17a is associated with the mode S address and matches that aircraft ID, then the verifier 17 provides a determination for the aircraft ID to be correct. Accordingly, when an aircraft ID acquired previous time from a target is coincident with an aircraft ID acquired current time, the verifier 17 provides a determination for the aircraft IDs acquired by the mode S secondary surveillance radar 1 to be correct. If the aircraft ID acquired previous time is not coincident with the aircraft ID acquired current time, the verifier 17 provides a determination for one of the aircraft IDs acquired by the mode S secondary surveillance radar 1 to be incorrect.

The channel management 11 is adapted to output a request signal in accordance with a result of determination input from the verifier 17. In other words, if a result of determination for an incorrect aircraft ID is input, the channel management 11 makes a schedule for re-acquisition of an aircraft ID from an identical target. On the other hand, when a result of determination for a correct aircraft ID is input, the scheduler 11 makes a schedule to finish acquiring an aircraft ID from an identical target.

The report generator 18 is adapted to target-wise prepare, and output to air traffic control system, a target report listing data on an altitude and a location, a mode S address, and the like, as they are input from the decoder 16, as well as an aircraft ID from the verifier 17. More specifically, the report generator 18 has a memory 18a for registration to store therein a target-wise data set from the decoder 16 with a mode S address, and an aircraft ID from the verifier 17 with a mode S address. The report generator 18 prepares, and outputs to the control system, a target report using data on an altitude and an aircraft ID associated with an identical mode S address.

Figure 4:
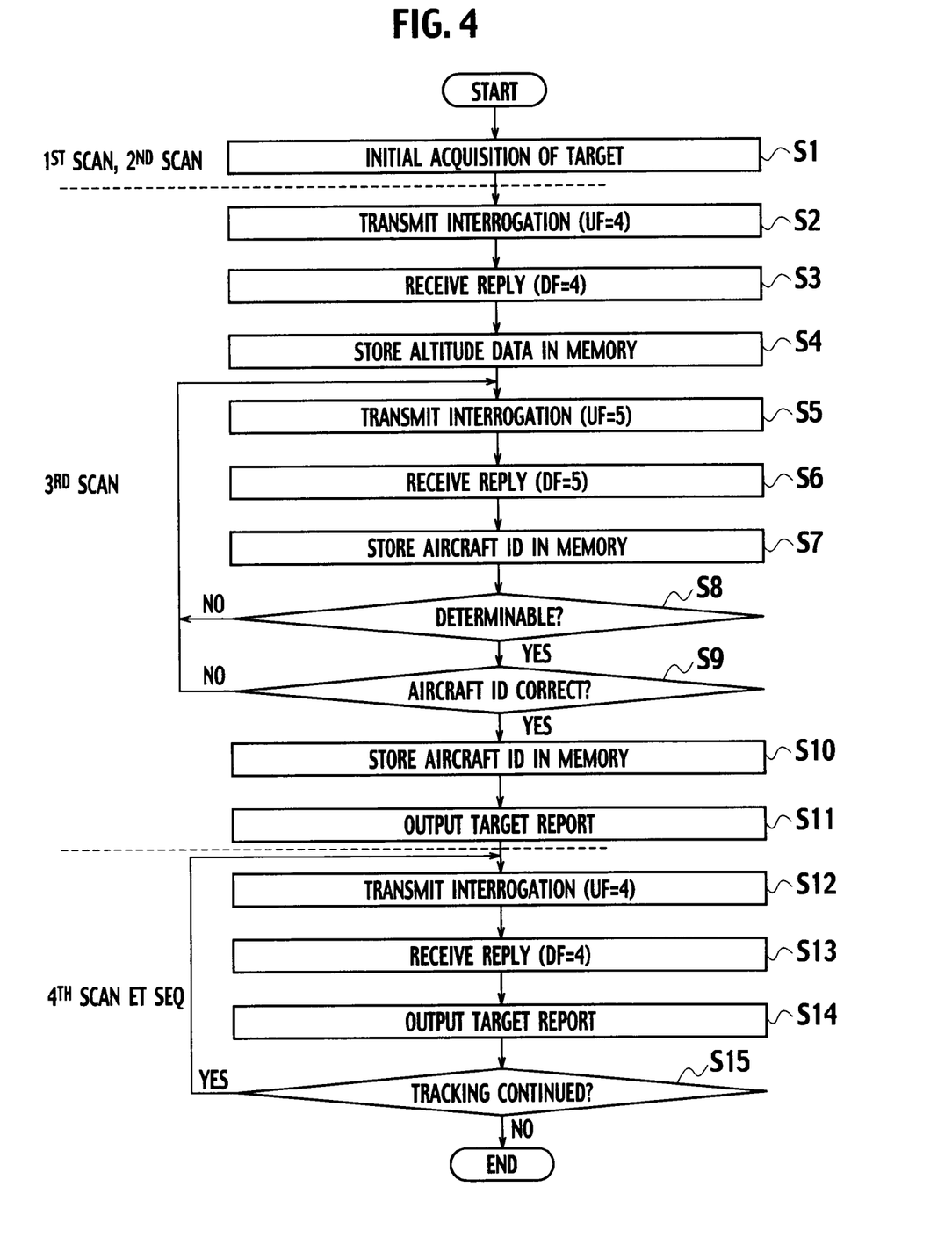
FIG. 4 is a flow chart of actions of the mode S secondary surveillance radar of FIG. 3.

Description is now made of target-wise control actions of the mode S secondary surveillance radar 1, with reference to a flowchart of FIG. 4. At a step S1, the mode S secondary surveillance radar 1 performs an initial acquisition in a first scan and a second scan in a conventional manner.

In a third scan immediately after the initial acquisition of the step S1, the mode S secondary surveillance radar 1 first performs an altitude acquiring transaction. More specifically, at a step S2, the transmitter 13 transmits an interrogation signal (UF=4) generated at the interrogation generator 12 in accordance with a request from the channel management 11, to a transponder on a target acquired in the initial acquisition.

Further, at a step S3, the receiver 15 receives a reply signal (DF=4) transmitted from the transponder. After that, at a step S4, the report generator 18 stores in the memory 18a a data set with a mode S address acquired by decoding the reply signal at the decoder 16.

Then, the mode S secondary surveillance radar 1 performs an ID acquiring transaction. More specifically, at a step S5, the transmitter 13 transmits an interrogation signal (UF=5) generated at the interrogation generator 12 in accordance with a request from the scheduler 11, to the transponder on the target.

After that, at a step S6, the receiver 15 receives a reply signal (DF=5) transmitted from the transponder. Thereafter, at a step S7, the verifier 17 stores in the memory 17a a data set with an aircraft ID and a mode S address acquired by decoding the reply signal at the decoder 16.

If a determination of aircraft ID is possible with aircraft IDs stored in the memory 17a (YES at a step S8), that is, if the memory 17a has a required number of aircraft IDs stored therein for the determination, then at a step S9, depending on whether or not aircraft IDs associated with an identical mode S address are coincident with each other, the verifier 17 determines whether or not the aircraft ID is correct.

On the other hand, if the determination of aircraft ID is impossible (NO at the step S8), that is, unless the memory 17a has a required number of aircraft IDs stored therein for the determination, then the steps S5 to S7 are repeated to acquire an aircraft ID from the target, before the flow goes to the step S9 for the verifier 17 to determine whether or not the acquired aircraft ID is correct.

Unless the verifier 17 provides a determination for the acquired aircraft ID to be correct (NO at the step S9), that is, unless aircraft IDs associated with an identical mode S address in the memory 17a are coincident with each other, then the steps S5 to S7 are repeated to reacquire an aircraft ID from the target, and the flow goes through the step S8 to the step S9, where the verifier 17 determines whether or not the acquired aircraft ID is correct.

If the acquired aircraft ID is determined to be correct (YES at the step S9), that is, if aircraft IDs associated with an identical mode S address in the memory 17a are coincident with each other, then at a step S10, the aircraft ID is output by the verifier 17 to the report generator 18 and stored in the memory 18a by the report generator 18.

After that, at a step S11, the report generator 18 prepares, and outputs to the air traffic control system, a target report using the data set stored in the memory 18a at the step S4 and the aircraft ID stored in the memory 18a at the step S10.

As the correct aircraft ID is stored in the memory 18a at the report generator 18, in a subsequent fourth scan, an altitude acquiring transaction (UF=4/DF=4) is performed in accordance with a request from the channel management 11, through steps S12 and S13. And at a step S14, the report generator 18 prepares, and outputs to the control system, a target report using the aircraft ID determined to be correct at the step S9 and a data set acquired by decoding a reply signal received at the step S13.

In subsequent scans after the fourth scan, as well, the steps S12 to S14 will be repeated like the fourth scan, so long as a tracking of the target is continued (YES at a step S15). More specifically, upon a failure to receive a sequence of reply signals (DF=4) at steps S13 in consecutive scans (e.g. consecutive two scans), the continued tracking goes to an end. To effect this, the number of sequential reception failures may well be set up by the mode S secondary surveillance radar 1, and is not restricted.

The foregoing description is addressed to the acquisition of aircraft ID within an immediate scan after an initial acquisition. After detection of an altered aircraft ID due to a changed flight status (FS), acquisition of a new aircraft ID is to be executed within the scan by steps like those from the third scan in FIG. 4.

In the embodiment shown in FIG. 4, the mode S secondary surveillance radar 1 acquires an altitude data by a combination of steps S2 and S3, before acquisition of an aircraft ID by a combination of steps S5 and S6, which may well be executed before acquisition of an altitude data.

Figure 5:
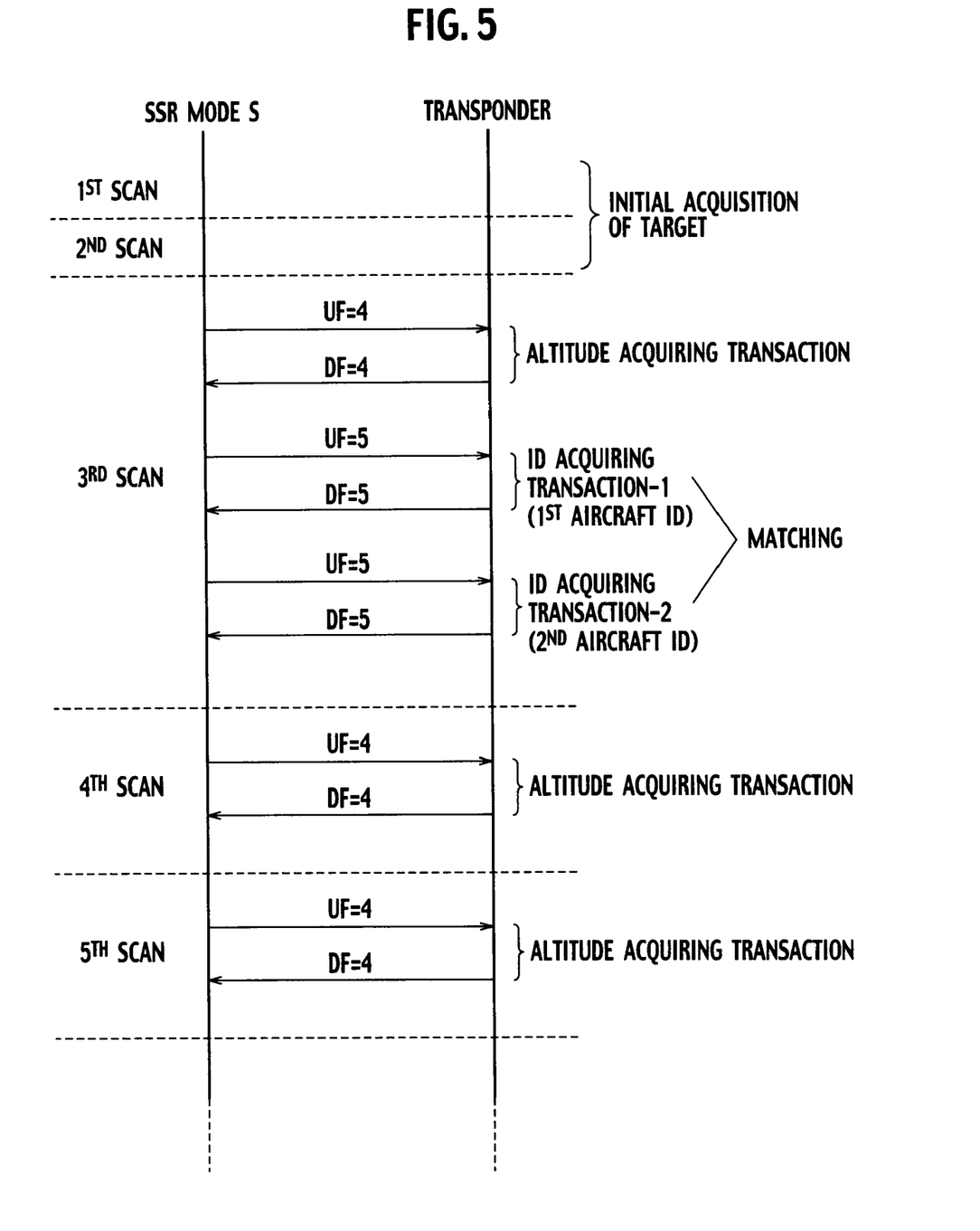
FIG. 5 is a time chart of an exemplary sequence of transactions along scans of the mode S secondary surveillance radar of FIG. 3.

For example, as shown in FIG. 5, the mode S secondary surveillance radar 1 may cooperate with a target to have a combination of steps S5 to S7 executed twice in the third scan. If a first aircraft ID acquired by an ID acquiring transaction-1 executed first time matches a second aircraft ID acquired by an ID acquiring transaction-2 executed second time, the report generator 18 may store the aircraft ID in the memory 18a at the report generator 18. After the aircraft ID is stored in the memory 18a at the report generator 18, the mode S secondary surveillance radar 1 will not perform any ID acquiring transaction with the target, and will employ the stored aircraft ID in a fourth scan et seq. So long as a tracking of the target is continued, the mode S secondary surveillance radar 1 will repeat steps like the fourth scan, although no more than a fifth scan is depicted in FIG. 5.

Figure 6:
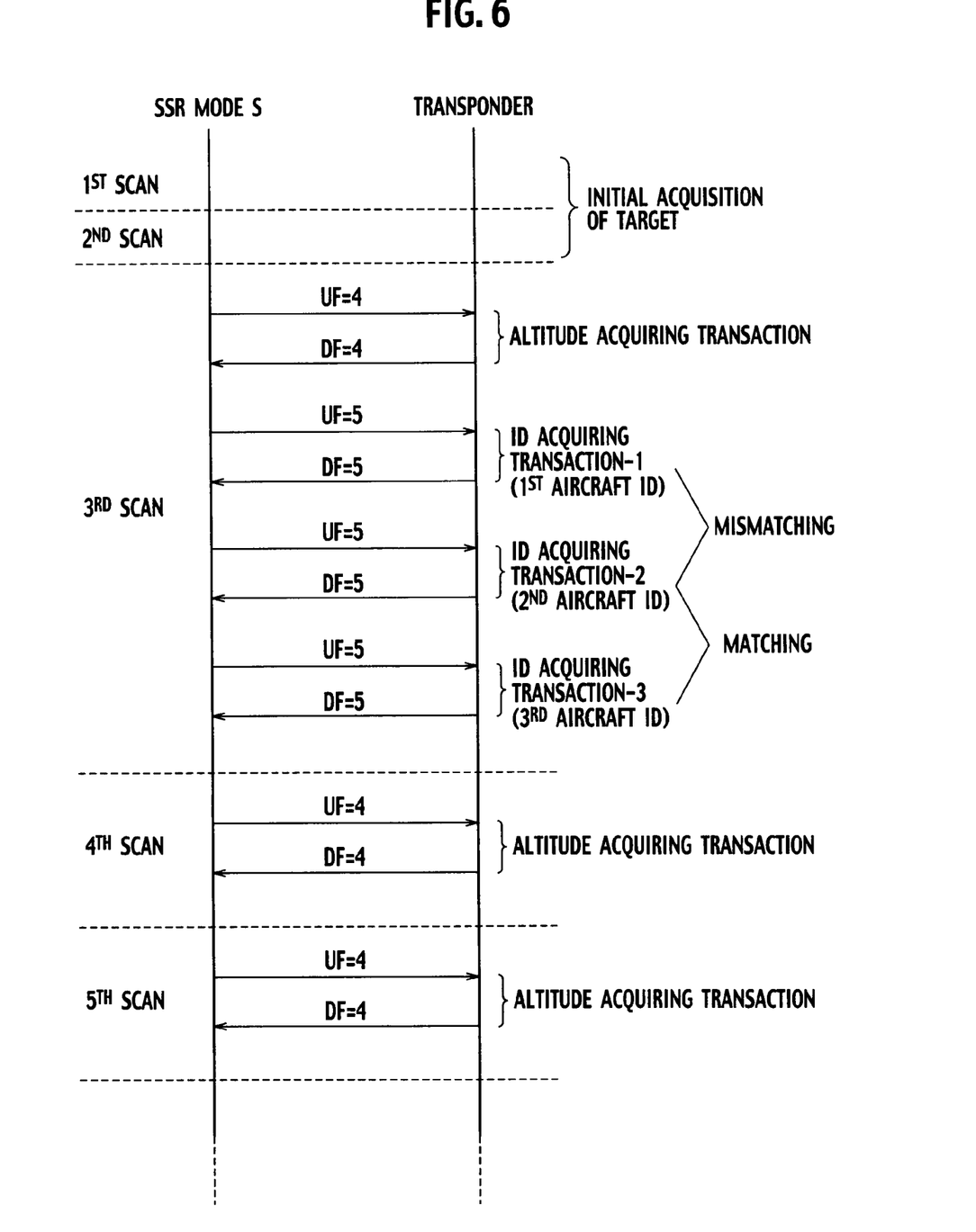
FIG. 6 is a time chart of another exemplary sequence of transactions along scans of the mode S secondary surveillance radar of FIG. 3.

On the other hand, as shown in FIG. 6, if the first aircraft ID mismatches the second aircraft ID, the mode S secondary surveillance radar 1 may have within the third scan an ID acquiring transaction-3 executed third time to acquire a third aircraft ID from the target. If the second aircraft ID matches the third aircraft ID, the report generator 18 may store the aircraft ID in the memory 18a. After the aircraft ID is stored in the memory 18a at the report generator 18, the mode S secondary surveillance radar 1 will employ the stored aircraft ID in a fourth scan et seq. As in FIG. 6, there may be a match between a second aircraft ID and a third aircraft ID after a mismatch between a first aircraft ID and the second aircraft ID, if the first aircraft ID is erroneous.

If the second aircraft ID is erroneous, then not simply the first aircraft ID, but also the third aircraft ID mismatches the second aircraft ID. For occurrence of an erroneous second aircraft ID, the mode S secondary surveillance radar 1 may have within the third scan an ID acquiring transaction executed fourth time to acquire a fourth aircraft ID. If the third aircraft ID matches the fourth aircraft ID, the reporter 18 may store the aircraft ID in the memory 18a, for employment thereafter.

If the third aircraft ID mismatches the fourth aircraft ID, the mode S secondary surveillance radar 1 may have within the third scan an ID acquiring transaction executed fifth time. If determination for a correct aircraft ID is yet impossible even thereafter, the mode S secondary surveillance radar 1 may repeat an ID acquiring transaction within the third scan, until a correct aircraft ID is determined. Still again, so long as a tracking of the target is continued, the mode S secondary surveillance radar 1 will repeat steps like the fourth scan, although no more than a fifth scan is depicted in FIG. 5.

In the foregoing description, the mode S secondary surveillance radar 1 has a determination for an aircraft ID to be correct, upon a match between continually acquired two aircraft IDs, which may well be a match full of continually acquired three aircraft IDs, with no restriction to the number of sequentially matching aircraft IDs.

In the embodiment described, the mode S secondary surveillance radar 1 may thus have an ID acquiring transaction executed a plurality of times within an immediate scan after an initial acquisition or within an immediate scan after detection of an altered aircraft ID due to a changed flight status (FS), and provide, upon a match full of continually acquired aircraft IDs, a determination for the aircraft ID to be correct, to be stored for a registration for employment thereafter. The mode S secondary surveillance radar 1 can employ simply an aircraft ID determined to be correct to prepare a target report, allowing for provision of correct information to a control system for air traffic control.

(First Modification)

Figure 7:
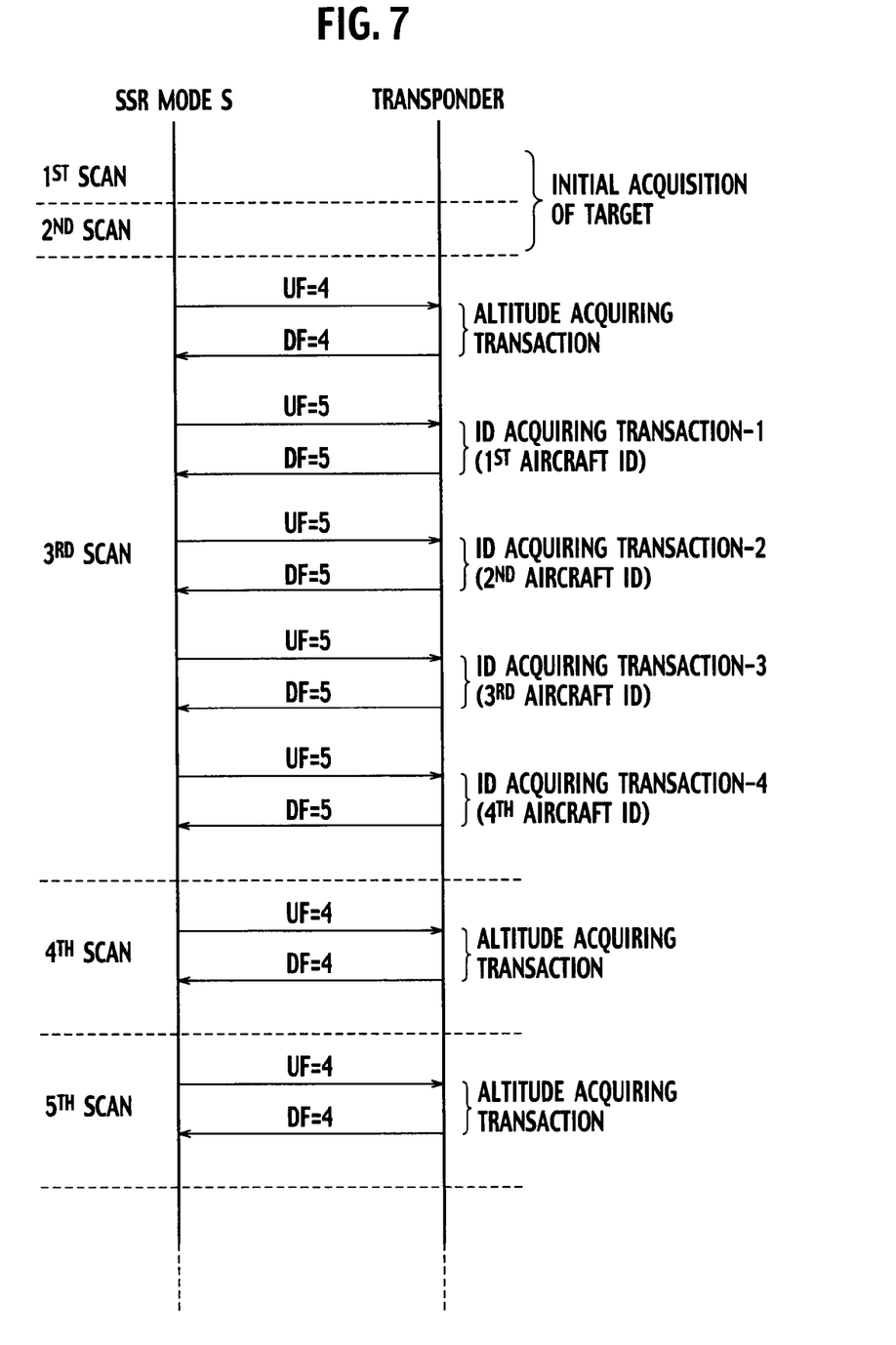
FIG. 7 is a time chart of an exemplary sequence of transactions along scans of a mode S secondary surveillance radar according to a first modification of the embodiment of the present invention.

Description is now made of a mode S secondary surveillance radar according to a first modification of the embodiment described, with reference to FIG. 7. For this modification, the embodiment is modified simply about a determination process, and the functional block configuration per se is left as in FIG. 1, so like elements in the modification are designated simply by like reference characters in FIG. 1 as supported by the block diagram, eliminating redundancy.

In the mode S secondary surveillance radar 1 of the embodiment, the verifier 17 provides a determination for a correct aircraft ID, depending on whether or not continually acquired aircraft IDs within a (third) scan have a sequential match therein. In the mode S secondary surveillance radar 1 of this modification, a verifier 17 provides a determination for a correct aircraft ID, depending on whether or not continually acquired aircraft IDs within a third scan have a match between more than half thereof. A failure for more than half to match is to be followed by re-acquisition of aircraft ID for determination.

The mode S secondary surveillance radar 1 of this modification may have within the third scan an ID acquiring transaction executed e.g. four times to acquire four aircraft IDs, as shown in FIG. 7, and provide, upon a match among three or more aircraft IDs, a determination for a matching aircraft ID to be correct, to be registered at a report generator 18.

In the mode S secondary surveillance radar 1 of this modification, the number of times the ID acquiring transaction is to be repeated (i.e. the number of aircraft IDs to be acquired) is preset at e.g. a channel management 11. If the number of ID acquiring transactions to be repeated is two, it is impossible to determine whether or not an aircraft ID is correct. The ID acquiring transaction should thus be repeated three or more times.

So long as a tracking of a target is continued, the mode S secondary surveillance radar 1 of this modification will repeat steps like a fourth scan in FIG. 7, although no more than a fifth scan is depicted there.

The mode S secondary surveillance radar 1 of this modification thus provides a determination depending on whether or not continually acquired aircraft IDs have a match between more than half thereof, which also allows for preparation of a reliable target report using a correct aircraft ID.

(Second Modification)

Figure 8:
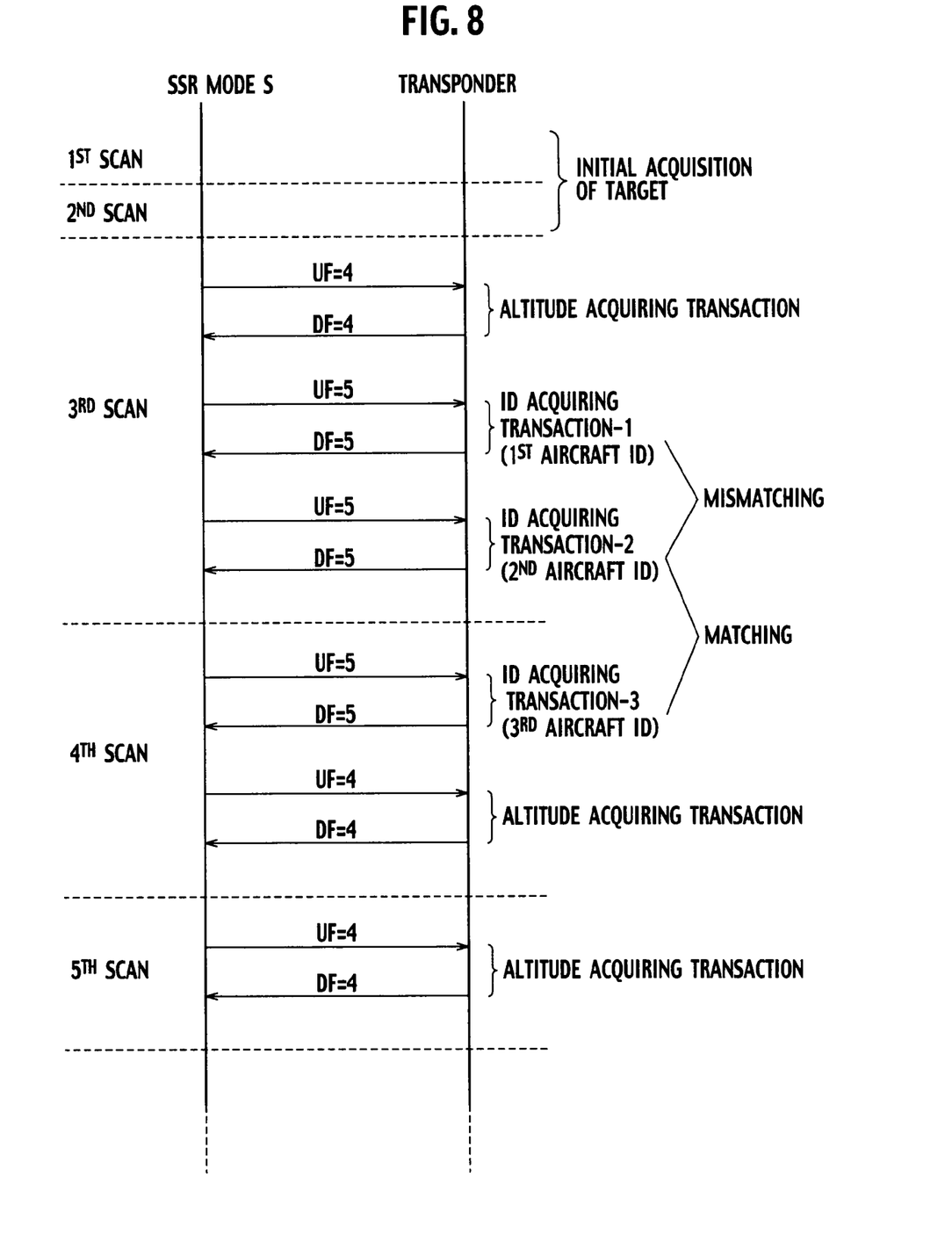
FIG. 8 is a time chart of an exemplary sequence of transactions along scans of a mode S secondary surveillance radar according to a second modification of the embodiment of the present invention.

Description is now made of a mode S secondary surveillance radar according to a second modification of the embodiment, with reference to FIG. 8. For this modification, the embodiment is modified simply about a determination process, and the functional block configuration per se is left as in FIG. 1, so like elements in the modification are designated simply by like reference characters in FIG. 1 as supported by the block diagram, eliminating redundancy.

In the mode S secondary surveillance radar 1 of the embodiment, the verifier 17 provides a determination for a correct aircraft ID, depending on whether or not aircraft IDs acquired within a (third) scan have a match therein. In the mode S secondary surveillance radar 1 of this modification, upon a failure to acquire aircraft IDs with a sequential match within a third scan, acquisition of aircraft ID is continually executed within a subsequent fourth scan as well, and a verifier 17 determines a correct aircraft ID from aircraft IDs acquired in different scans.

In the mode S secondary surveillance radar 1 of this modification, upon acquisition of e.g. two aircraft IDs with a match, they are stored for registration at a report generator 18. Description is made of this case. It is now supposed that, as shown in FIG. 8, a mismatch between a first aircraft ID and a second aircraft ID is followed by a failure to execute, within a third scan, an ID acquiring transaction at a false third time with a target. Then, a channel management 11 generates a request signal for an ID acquiring transaction-3 to be executed third time to acquire a third aircraft ID in a subsequent fourth scan. After that, as shown in FIG. 8, if the second aircraft ID acquired in the third scan matches the third aircraft ID acquired in the fourth scan, a reporter 18 stores the aircraft ID therein for a registration for employment in the mode S secondary surveillance radar 1 of this modification.

In FIG. 8, a correct aircraft ID is determined by a match between two aircraft IDs, while no restriction is set to the number of aircraft IDs to be acquired for the verifier 17 to determine a correct aircraft ID. So long as a tracking of a target is continued after registration of a correct aircraft ID, the mode S secondary surveillance radar 1 of this modification will repeat steps like a fifth scan in FIG. 8, although no more than the fifth scan is depicted there.

The mode S secondary surveillance radar 1 of this modification thus functions, upon a failure to determine a correct aircraft ID from aircraft IDs acquired in a scan, to use an aircraft ID acquired in a subsequent scan as well, which also allows for preparation of a reliable target report using a correct aircraft ID.

The present invention can provide a mode S secondary surveillance radar adapted for acquisition of a correct aircraft ID to output a reliable target report with contribution to an ensured safety of air traffic control.

While preferred embodiments of the present invention have been described using specific terms, such description is for illustrative purposes, and it is to be understood that changes and variations may be made without departing from the spirit or scope of the following claims.

What is claimed is:

1. A mode S secondary surveillance radar for detecting aircraft flying in an airspace under surveillance, comprising:
    a transmitter adapted in an immediate scan after one of an initial acquisition and a detection of an altered aircraft ID by a changed flight status, to transmit to an aircraft a sequence of interrogation signals requesting an aircraft ID transmission;
    a verifier adapted upon an acquisition of a reply signal including an aircraft ID transmitted from a transponder on the aircraft, to store in a memory a mode S address assigned to the aircraft and the aircraft ID in an associating manner, and upon an occurrence of a storage of aircraft IDs associated with the mode S address in the memory, to determine whether or not the aircraft ID is correct, depending on whether or not the aircraft IDs have a match therein; and
    a reporter adapted upon a determination for the aircraft ID to be correct, to prepare a target report using the aircraft ID.

2. The mode S secondary surveillance radar as claimed in claim 1, wherein the verifier provides a determination for the aircraft ID to be correct, as the aircraft IDs associated with the mode S address in the memory have been continually acquired from the aircraft and match full.

3. The mode S secondary surveillance radar as claimed in claim 1, wherein the verifier provides a determination for the aircraft ID to be correct, as the aircraft IDs associated with the mode S address in the memory comprise three or more aircraft IDs having a match between more than half thereof.

4. The mode S secondary surveillance radar as claimed in claim 1, comprising:
    a scheduler adapted upon a failure of the verifier to determine a correct aircraft ID from aircraft IDs acquired in a scan, to have the transmitter transmit an interrogation signal to additionally acquire an aircraft ID from the aircraft in the scan; and
    the verifier providing a determination for an aircraft ID to be correct from a combination of an aircraft ID acquired in the scan and an aircraft ID additionally acquired in the scan.

5. The mode S secondary surveillance radar as claimed in claim 1, comprising:
    a channel management adapted upon a failure of the verifier to determine a correct aircraft ID from aircraft IDs acquired in a scan, to have the transmitter transmit an interrogation signal to additionally acquire an aircraft ID from the aircraft in a subsequent scan; and
    the verifier providing a determination for an aircraft ID to be correct from a combination of an aircraft ID acquired in the scan and an aircraft ID additionally acquired in the subsequent scan.

* * * * *